May 30, 1939.　　　　F. J. KURTH　　　　2,160,549
AIR CONDITIONING DEVICE
Filed April 21, 1937
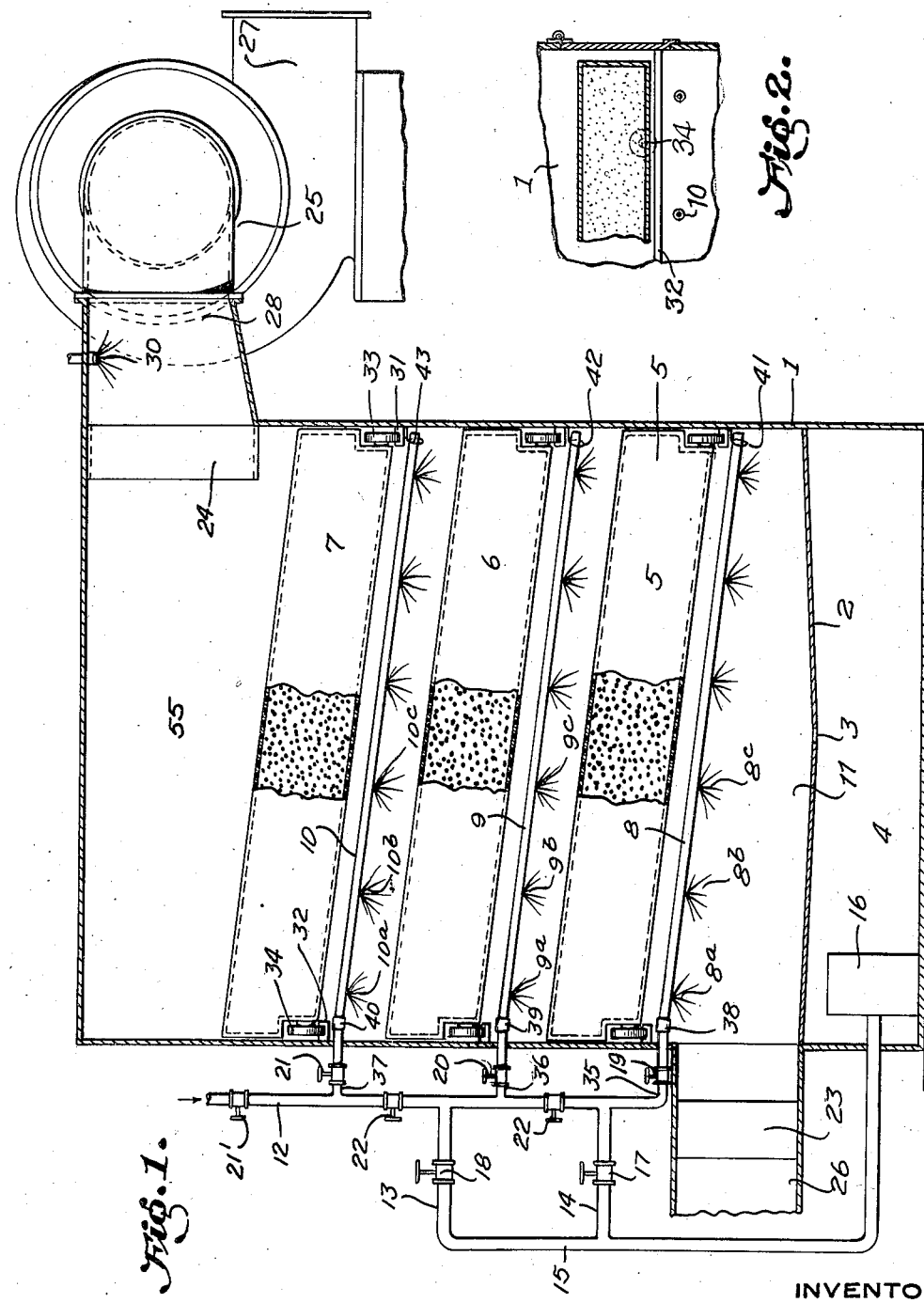
INVENTOR
FRANZ J. KURTH.
BY
ATTORNEY Patented May 30, 1939

2,160,549

UNITED STATES PATENT OFFICE 2,160,549

AIR CONDITIONING DEVICE

Franz J. Kurth, New York, N. Y.

Application April 21, 1937, Serial No. 138,071

1 Claim. (Cl. 261—98)

My invention relates to air treating apparatus generally known as air conditioning devices.

The object of the present invention is to devise an apparatus whereby air may be effectively cleaned, purified and cooled, and be delivered with a desired moisture content and of the desired temperature, and the particular object of this invention is to produce an apparatus of comparatively small compass and one which can be installed, maintained and operated at low cost and whereby the above can be accomplished in the most efficient and economic manner.

In order to bring about an efficient cleaning, purifying and cooling of air solely by water, it is necessary that the air be brought into the closest intimate contact with the water. To this end, in accordance with my invention, the air is caused to pass through a plurality of superposed spaced apart layers composed of a very large number of small ceramic bodies and continually sprayed by water so that the air in successively passing upwards through these various layers is repeatedly brought into the most intimate contact with the water directed in fine streams against the layers from above through nozzles provided above the layers, except the topmost layer, which is not moistened and which hereinafter will be referred to as the "dry" layer.

Water of various temperatures may be supplied to the various layers to thereby gradually cool the air as it passes upwards through the various layers. The water from all the various layers, together with the water used in the pre-moistening chamber below the bottom layer, is collected in a tank at the bottom of the casing containing the various layers, which tank includes a pump for the re-circulation of the water.

To provide as large a surface as possible without giving the apparatus undue dimensions, the layers, which, as has been stated above, are composed of a very large number of ceramic bodies, are given an inclined position, whereby the size of the layers and thereby the number of the ceramic bodies and the total surface area are considerably increased.

In the pre-moistening chamber, the air is freed from the coarser impurities, whereas during the passage of the air through the various layers, even the very finest dust particles and any bacteria carried by the air are successfully removed therefrom, so that absolutely pure air of the desired moisture content and temperature is delivered by the apparatus. While the air passes through the numerous interstices formed by the ceramic bodies of the various layers, the water particles carried by the air due to the cooling effect are condensed and thus become separated from the air, carrying with them any fine dust particles suspended in the air, which are then removed by the sprays of water passing down through the layers. Because of the use of ceramic bodies and the continual cleaning of the same by the downwardly flowing water, the layers will always present free passages for the flow of the air.

At the air-inlet side of the casing as well as at the air-outlet or discharge side thereof, a heater is preferably provided, and the air is drawn through the casing by an exhaust fan provided at the outlet or discharge end of the casing.

The various layers as well as the pipes carrying the nozzles for spraying water against the layers may be made removable for cleaning and repairing purposes.

For a fuller understanding of my invention, I refer to the following description with reference to the appended drawing, in which:

Fig. 1 is a vertical section through an apparatus constructed in accordance with the invention; and Fig. 2 is a detail vertical section at right angles to Fig. 1 through a portion of the apparatus.

In the drawing, I designates a closed casing provided inside with a slanting bottom plate 2 having a drain-hole 3 in the center and forming with the bottom of the casing a collecting tank 4. In the larger upper portion of the casing there are disposed in superposed relation and suitably spaced apart several layers each comprising a bed composed of a large number of ceramic bodies, or similar material, three such beds being shown respectively at 5, 6 and 7. As seen in the drawing, these beds are inclined relative to the walls of the casing so as to provide as large surfaces as possible, without unduly increasing the dimensions of casing 1.

At 8, 9 and 10 are shown pipes extending through the intermediate spaces between the said beds and below the bottom bed 5. Each of these pipes is provided with a plurality of spray nozzles, respectively designated by $8^a$, $8^b$, etc., $9^a$, $9^b$, etc., and $10^a$, $10^b$, etc., and so disposed as to direct fine sprays respectively into the space 11 intermediate the bottom plate 2 and the bottom bed 5 and against the beds 5 and 6. At 12 is shown one of vertically disposed pipes connected with the nozzle carrying pipes 8, 9 and 10, and whereby fresh water is supplied to these latter pipes. Into pipe 12 also terminate the branches 13 and 14 of a pipe 15, which is connected to a pump 16 housed in the collecting tank 4, and whereby the water in said collecting tank may be recirculated to be used again for spraying the bottom bed 5 and space 11 intermediate said bottom bed and the bottom-plate 2. Suitable valves are shown at 17, 18, 19, 20, 21 and 22. 23 and 24 designate heating devices or heating elements provided respectively at the inlet and outlet end of the casing, while 25 designates an exhaust fan to draw air through the apparatus, the air entering at 26, and being discharged through an outlet shown at 27.

Intermediate the heating element 24 and the exhaust fan 25 is provided a connecting piece 28 supported by the outer wall of casing 1. At the top of said connecting piece spray-nozzles are provided, one being shown at 30, which nozzles are supplied with water from a source not shown.

To enable the beds 5, 6 and 7 to be cleaned, if necessary, they are made removable. To this end there are fastened to the inner wall of the casing U-shaped guide-rails as shown at 31 and 32, whereas the beds are provided with rollers as shown at 33 and 34 in respect of bed 7 so that the beds can be readily withdrawn from the casing, which to that end is provided at its front with removable wall sections (not shown). Similar guide-rails are, of course, provided for the beds 5 and 6, which also are equipped along their sides with suitable rollers.

Likewise, the nozzle carrying pipes 8, 9 and 10 coupled respectively to the branches 35, 36 and 37 of pipes 12 at 38, 39 and 40 respectively after being uncoupled thereform can be removed from the casing, access to these pipes being given through the said removable sections of the front wall of the casing. The free ends of the pipes are loosely supported by suitable hook-shaped members fastened to the inner wall of casing 1, as shown at 41, 42, and 43.

The operation of the apparatus may be briefly described as follows:

The air is admitted to casing 1 through the air-inlet shown at 26 and flowing past the heating device or element 23, enters the chamber 11, where it is pre-moistened and effectively freed from any coarse impurities by being subjected to a large number of fine sprays of water downwardly directed by the spray-nozzles 8ª, 8ᵇ, 8ᶜ, etc. Being drawn into the casing by the fan 25, the air flows upwards successively passing through the beds 5, 6 and 7. The beds 5 and 6 being continually sprayed by water directed against them from above by the spray-nozzles 9ª, 9ᵇ, 9ᶜ, etc., and 10ª, 10ᵇ, 10ᶜ, etc., respectively, the air in passing through these beds is brought into most intimate contact with the water surrounding the numerous ceramic bodies of which the two beds are composed. After having passed through the bed 5, the air is saturated to the dew point and at the same time is cooled below the temperature with which it entered the casing. In passing through the second bed 6, the air is further cooled, while its moisture content is reduced. The top bed 7 is a dry bed not being subjected to any sprays, and the air in passing through this bed is further cooled, and its moisture content is further reduced. Because of the necessary cooling of the air, the water particles carried thereby are condensed on the ceramic bodies of which the beds are composed and thereby the finest dust particles suspended in the air, including any bacteria, are effectively removed from the air, so that the air when leaving the dry bed 7 at the top of the casing is completely purified. On its way from the top chamber 55 to the outlet 27, the air passes through the heating device or heating element 24, and in the connecting piece 28 may be moistened again by water delivered by the spray-nozzle 30.

The air discharged through the air outlet 27 is purified air of the desired moisture content and temperature. Depending on the size and the number of revolutions of the exhaust fan 25, the velocity of the flow of air through the casing may be regulated as desired. In order that the best results be obtained, the air must not flow through the casing at too great a velocity, because in that case the air would carry along with it the dust particles without being freed therefrom.

Fresh water is supplied to the spray-nozzles shown in the drawing through pipe 12, which is connected with the pipes 8, 9 and 10 through the branches 35, 36 and 37. The water delivered by the spray-nozzles flows down to the bottom-plate 2 and from there into the collecting tank 4. Now, this water may be re-circulated through the nozzle carrying pipes and the beds inside casing 1. In that case, the valve 21 in pipe 12 is closed, the pump 16 in the collecting tank 4 is started, and the previously closed valves 17 and 18 in the branches 13 and 14 of pipe 15 are opened. Also, it may be desired, to direct against the bed 6 fresh water, while re-circulating through the bed 5 and the pre-moistening chamber 11 water collected in the tank 4. In that case, the valve 21' in pipe 12 is opened, but the valve 22 further down in the pipe 12 is closed, while the valves 17 and 18 are opened as before.

By the water in collecting tank 4 being used for re-circulation, as will be obvious, a great saving in water can be achieved, whereby the apparatus may be very economically operated.

Furthermore, because of the beds being composed of ceramic bodies, it will be apparent that, since the water in flowing downwards continually washes the ceramic bodies, the beds will not easily become clogged, so that cleaning of the beds will be required only at rare intervals.

I claim:

In a device of the type described, in combination with a closed casing having an air inlet and an air outlet, a plurality of beds of ceramic or like hygroscopic bodies disposed in said casing in superposed relationship at an inclination extending from one wall of said casing to the opposite wall and spaced apart to form chambers between them, a bottom-plate having a drain opening and forming with the lowermost of said beds a pre-moistening chamber, spray-nozzles in said chambers and in said pre-moistening chamber, means for supplying a liquid to said spray-nozzles, means for circulating air through said casing and said beds of material, a tray for supporting each of said beds, rollers on said trays, and guide rails secured to the walls of the casing to support said rollers, the casing having openings through which said trays are removable by rolling of said rollers on said guide rails, and closures for said openings.

FRANZ J. KURTH.